S. L. TIMMONS.
TRACTION ENGINE.
APPLICATION FILED JAN. 11, 1916.
1,342,779.
Patented June 8, 1920
5 SHEETS—SHEET 1.
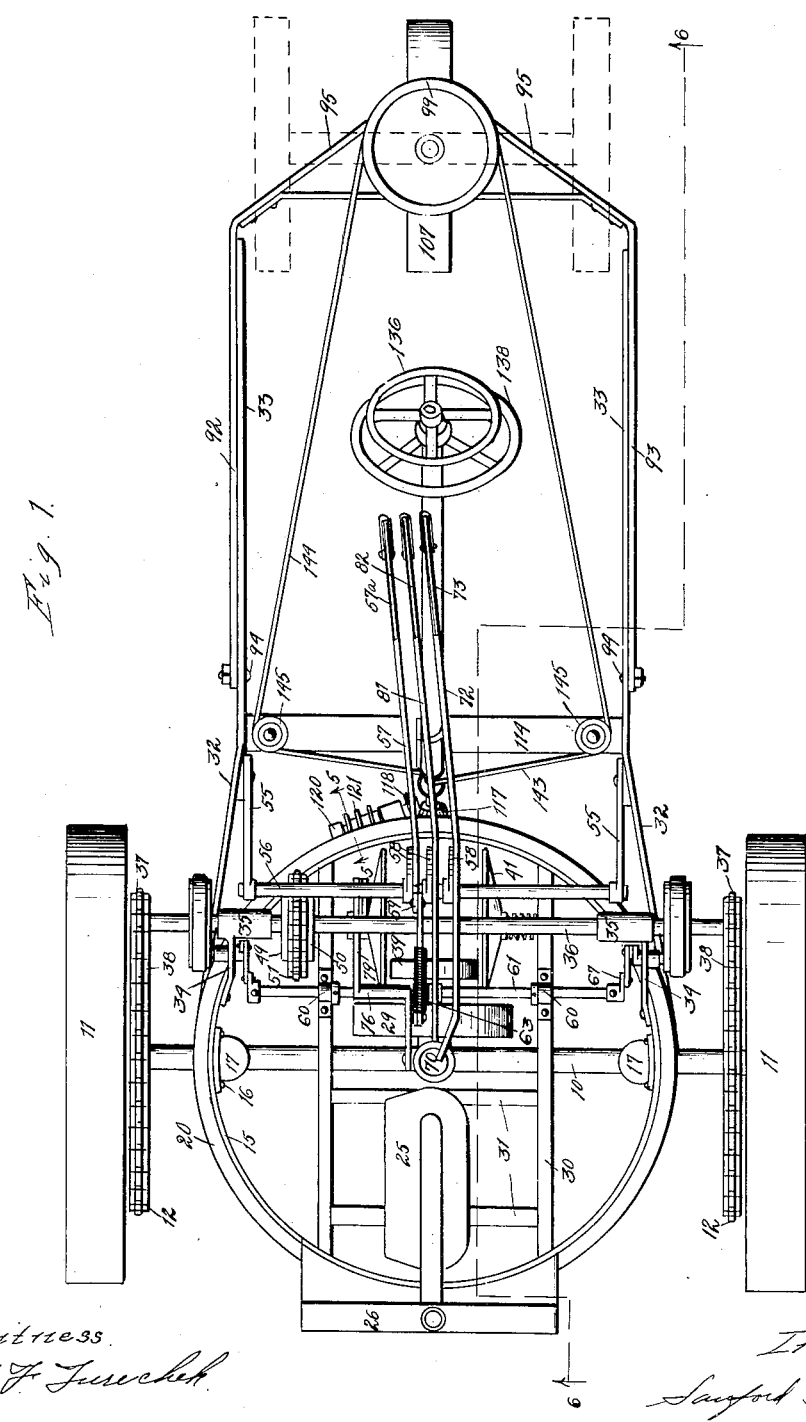

S. L. TIMMONS.
TRACTION ENGINE.
APPLICATION FILED JAN. 11, 1916.
1,342,779.
Patented June 8, 1920.
5 SHEETS—SHEET 2.
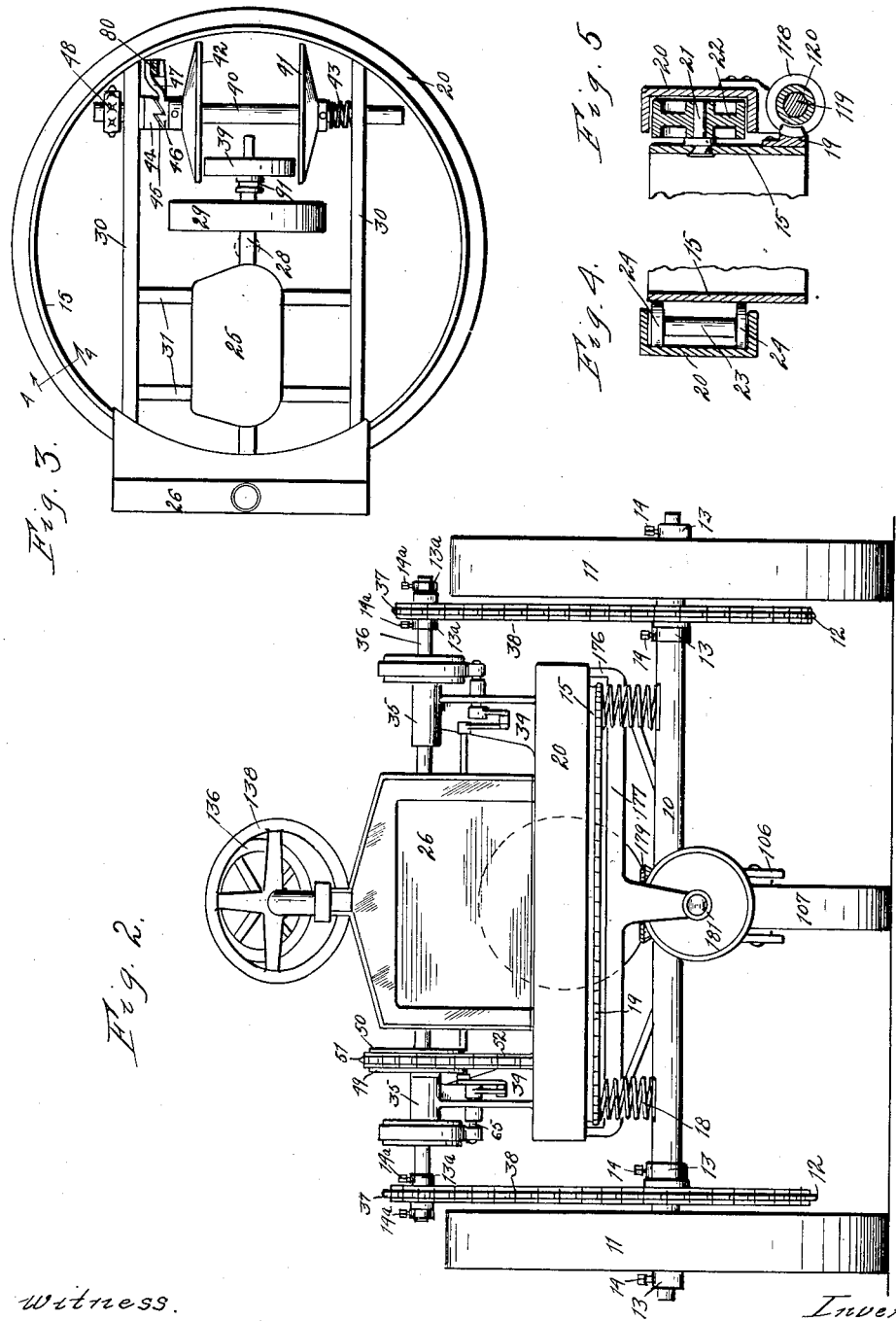

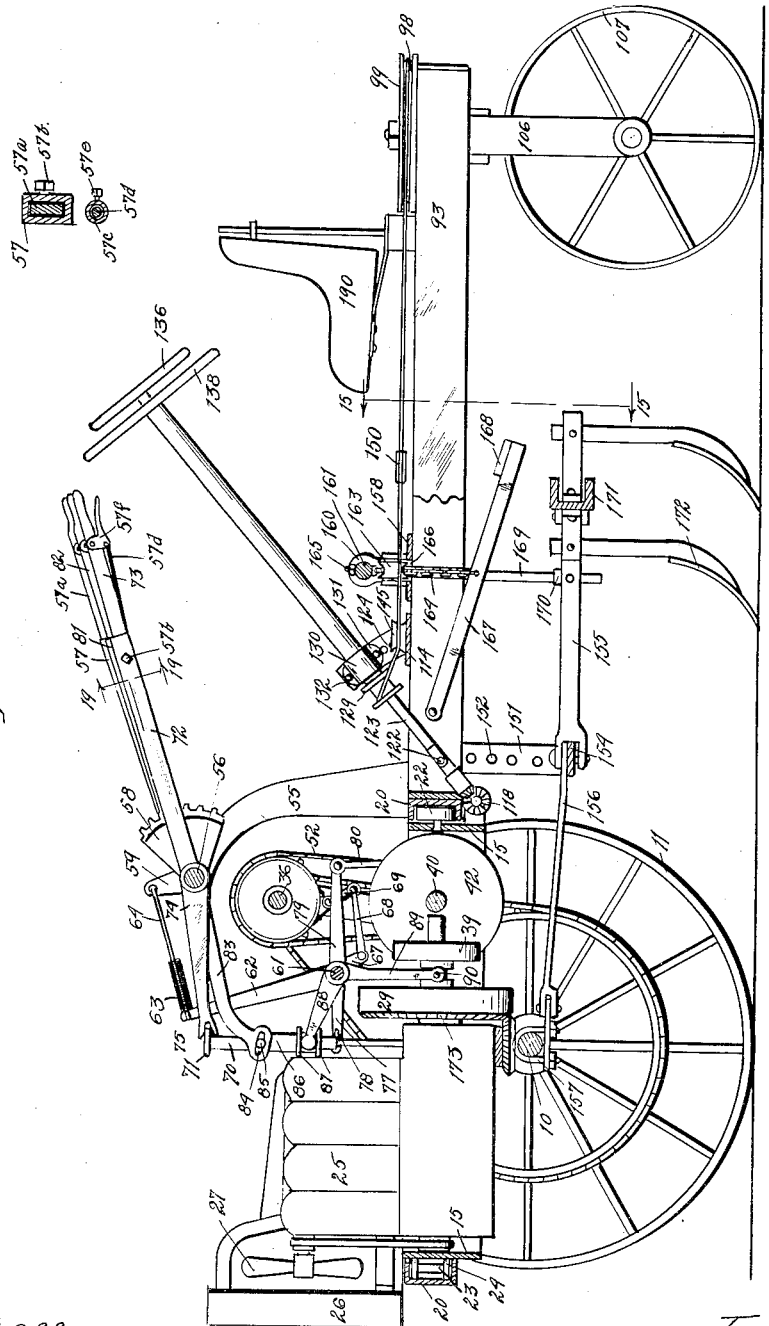

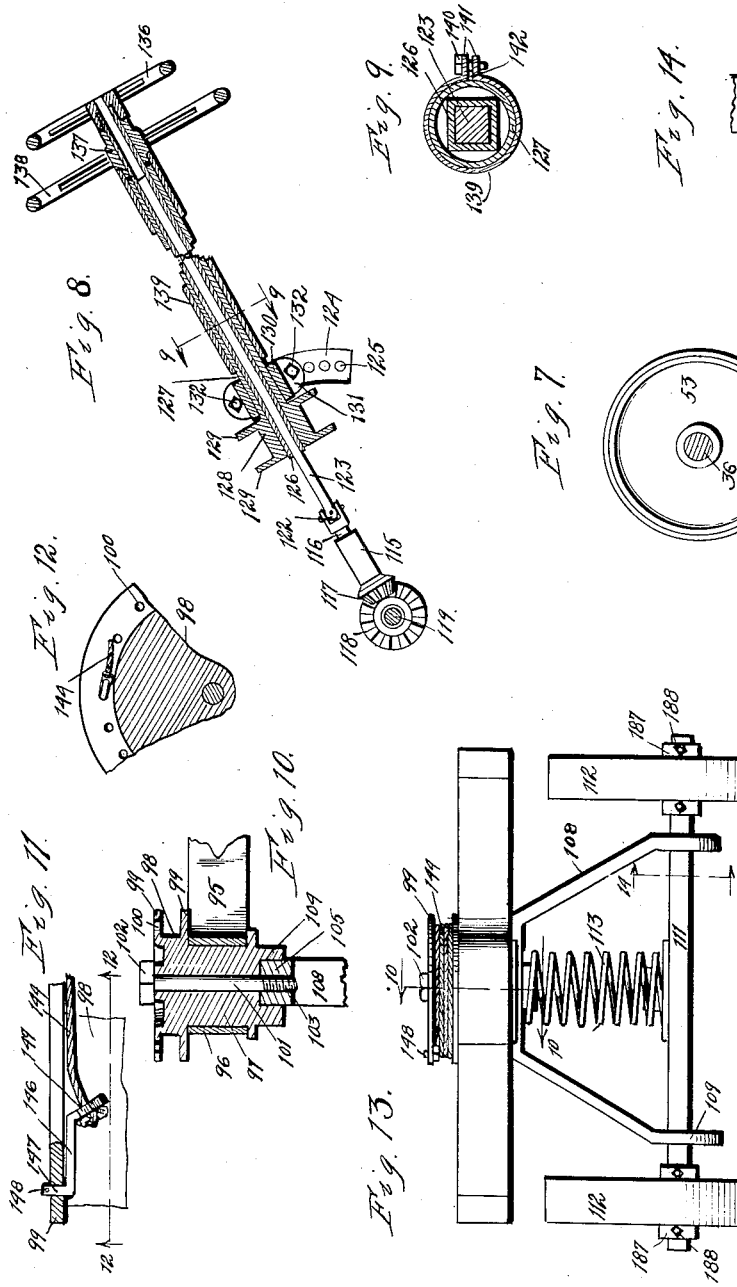

S. L. TIMMONS.
TRACTION ENGINE.
APPLICATION FILED JAN. 11, 1916.
1,342,779.
Patented June 8, 1920.
5 SHEETS—SHEET 5.
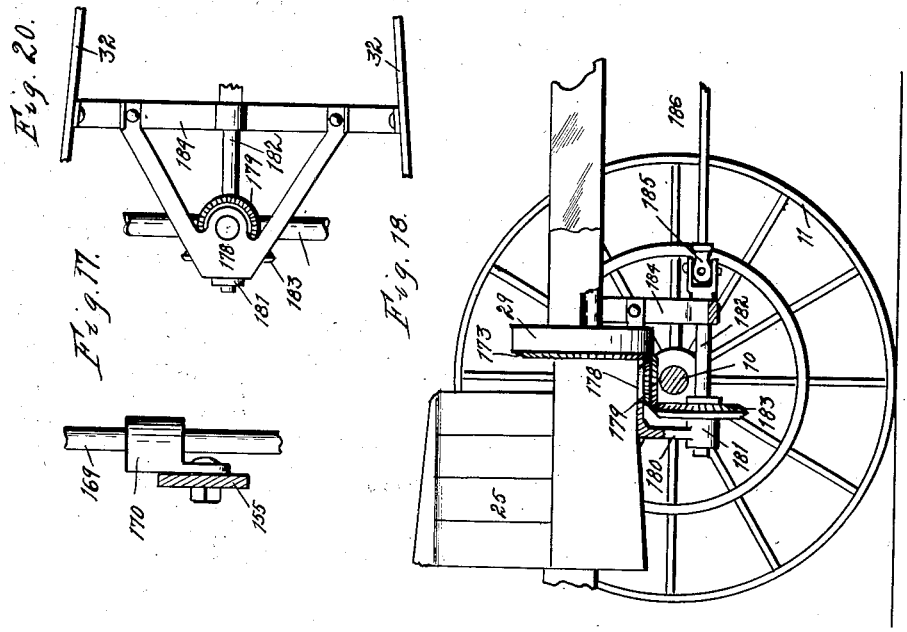
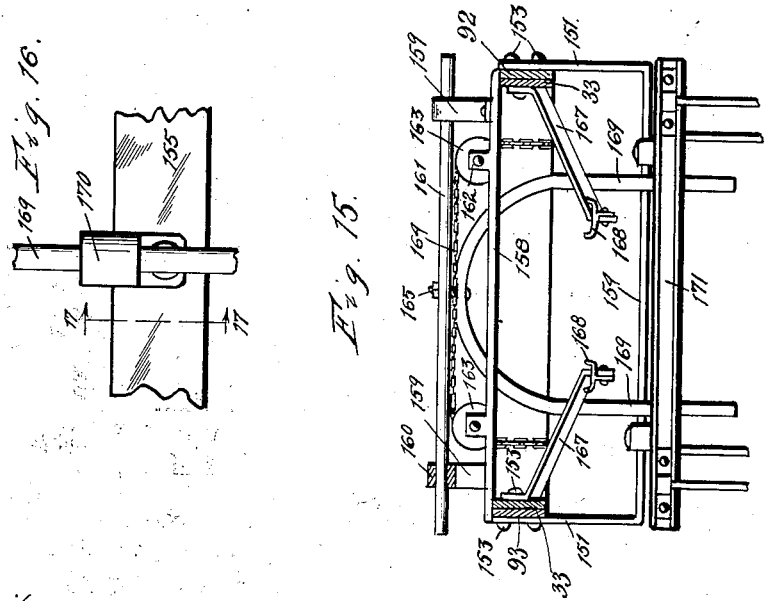
Witness
G. F. Turechek
Inventor
Sanford L. Timmons
by Orwig & Bair
Attys.

UNITED STATES PATENT OFFICE.

SANFORD L. TIMMONS, OF DES MOINES, IOWA.

TRACTION-ENGINE.

1,342,779.   Specification of Letters Patent.   Patented June 8, 1920.

Application filed January 11, 1916. Serial No. 71,441.

*To all whom it may concern:*

Be it known that I, SANFORD L. TIMMONS, a citizen of the United States, and resident of Des Moines, in the county of Polk and State of Iowa, have invented a certain new and useful Traction-Engine, of which the following is a specification.

The object of my invention is to provide a traction engine adapted to a variety of uses.

A further object is to provide such a traction engine which may be readily and easily attached to various other machines and implements for drawing them over the ground, or for operating their mechanism.

A further object is to provide such a device capable of being attached to various implements and machines, and having controlling mechanism adjustable, so that it may be accessible from the seat of different kinds of machines.

A further object is to provide such a traction engine having a portion so mounted on the main part of the traction engine as to be quickly and easily removed for substituting another machine or implement, which portion is so connected with the main body of the engine as to be used in connection therewith when desired.

A further object is to provide a traction engine in which all the wheels are steerable, and to provide suitable means for steering all of said wheels.

A further object is to provide a traction engine in which the heavy parts are supported upon an axle, and in which the controlling mechanism is carried on a turntable, and to provide such a device with suitable means for connecting the controlling mechanism with the heavy parts of the engine, whereby the engine may be operated in any of the positions of said axle.

A further object is to provide such an engine having such a detachable portion, as has been hereinbefore referred to, and such a steering mechanism adapted to be quickly and easily connected with said removable portion.

Still a further object is to provide such a traction engine having a portion which is both removable and adjustable for mounting different implements on said engine.

A further object is to provide in such a traction engine, means for operating the independent mechanism of another machine or the like from the engine independently of the traction wheels.

Still a further object is to provide in such a machine, traction wheels capable of being adjusted on the main shaft for changing the tread of the machine, and to provide adjustable mechanism for operatively connecting it with the adjustable traction wheels.

My invention consists in the construction, arrangement and combination of the various parts of the device, whereby the objects contemplated are attained as hereinafter more fully set forth, pointed out in my claims and illustrated in the accompanying drawings, in which:

Figure 1 shows a top or plan view of a traction engine embodying my invention.

Fig. 2 shows a front elevation of the same.

Fig. 3 shows a top or plan view of the rotary turn-table, with the engine mounted thereon, this view showing also the transverse shaft operatively connected with the engine shaft.

Fig. 4 shows a detail, sectional view, taken on the line 4—4 of Fig. 3.

Fig. 5 shows a detail sectional view, taken on the line 5—5 of Fig. 1.

Fig. 6 shows a longitudinal, sectional view, taken on the line 66 of Fig. 1.

Fig. 7 shows a detail, view of the band brake.

Fig. 8 shows a longitudinal, sectional view of the steering rod.

Fig. 9 shows a sectional view taken on the line 9—9 of Fig. 8.

Fig. 10 shows a detail, sectional view taken on the line 10—10 of Fig. 13.

Fig. 11 shows a detail view of a part of the steering mechanism at the rear end of the machine.

Fig. 12 shows a detail, sectional view taken on the line 12—12 of Fig. 11.

Fig. 13 shows a rear elevation of a modified form of a machine.

Fig. 14 shows a detail, sectional view of the form of the device shown in Fig. 13, taken on the line 14—14 of Fig. 13.

Fig. 15 shows a vertical, transverse, sectional view taken on the line 15—15 of Fig. 6.

Fig. 16 shows a detail view of part of the mechanism for mounting the cultivator on the frame of a machine.

Fig. 17 shows a sectional view, taken on the line 17—17 of Fig. 16.

Fig. 18 shows a vertical, longitudinal, sectional view of the front part of the machine with an attachment thereon for running the mechanism of another machine directly from the engine.

Fig. 19 shows a sectional view taken on the line 19—19 of Fig. 6, and

Fig. 20 shows a top or plan view of the brake and part of the gears thereon for connecting the engine with the mechanism of an independent engine.

In the accompanying drawings, I have used the reference numeral 10 to indicate generally the main shaft or axle of the machine on which are mounted the traction wheels 11. Mounted on, or secured to the traction wheels 11, on the inner sides thereof are sprockets 12. The wheels 11 are designed to rotate on the axle 10. If desired they may be longitudinally adjustable on said axle and may be held in position by means of collars 13 and set-screws 14.

Spaced above the axle 10 is an annular frame member 15. Mounted on the frame member 15 by means of bolts or the like 16, at opposite sides of said frame, are downwardly opening spring cups 17, clearly shown in Fig. 1, and omitted from Fig. 3. Mounted on the axle, in any suitable way and arranged with their upper ends received within the cups 17, are coil springs 18, shown in Fig. 2.

On the annular frame member 15 is a gear 19 adapted to coact with the worm gear, hereinafter referred to.

Slightly spaced from the frame member 15 on the outside thereof is an annular inwardly opening channel-shaped frame 20. Mounted in the frame 15 are a plurality of laterally extending horizontal shafts or spindles 21. On the spindles 21 are rollers 22, rotatably mounted to travel in the channel-shaped frame 20, which thus forms a sort of turn-table.

To hold the frame 20 spaced from the frame 15 and to prevent friction with the sides of the rollers or wheels 22, there are loosely mounted in the channel-shaped frame 20 a plurality of upright spindles 23, having on each end a roller 24, as shown in Fig. 4. The spindles 23 and rollers thereon form guides, for the purposes mentioned, and are preferably arranged alternately with the rollers 22.

Suitably supported upon the frame 15 is a source of power such as the engine 25, having the radiator 26, the fan 27, the engine shaft 28, and the fly wheel 29 thereon. The device may be built with frame members 30 supported on the frame 15 and arranged parallel with each other longitudinally of the machine, as shown in Fig. 1. Transverse frame members 31 supported on the frame members 30 may be employed for supporting the engine 25.

Secured to the frame 20, on opposite sides thereof, just rearwardly of the axle 10 are rearwardly extending frame members 32, which extend inwardly and rearwardly.

Extending rearwardly from the frame members 32 are parallel spaced frame members 33. The members 33 are designed to have a detachable part of the frame, secured thereto, or if desired, to have various farm implements which the user may desire to pull with my improved engine secured thereto.

On the frame 15, preferably just rearwardly of the axle 10 on opposite sides of said frame, are upwardly extending brackets 34, at the upper ends of which are formed alined bearings 35, in which is mounted a transverse shaft 36.

Mounted near the ends of the shaft 36 are sprocket wheels 37, arranged in line with the respective sprocket wheels 12. The sprockets 37 may be slidably but non-rotatably mounted on the shaft 36, and may be held against sliding movement by means of collars 13$^a$ and set screws 14$^a$, similar to the collars 13 and set-screws 14 already described. It will thus be seen that the sprockets 37 may be adjusted, so that they may be kept in line with the sprockets 12 if the wheels 11 are adjusted longitudinally on the shaft 10. Sprocket chains 38 travel on the sprockets 12 and 37.

For transmitting power from the engine to the sprockets 12, and thence to the traction wheels 11, the following structure is employed.

Slidably but non-rotatably mounted on the rear end of the shaft 28 is a friction wheel 39. Rotatably supported on the frame 15, as for instance on the members 30 is a transverse shaft 40, which is also capable of slight sliding movement. Mounted on the shaft 40 and fixed thereto are spaced friction disks 41 and 42. The disks 41 and 42 are spaced from each other a distance slightly greater than the diameter of the friction wheel 39, and are adapted in different positions of their movement to coact with said wheel 39.

Between the friction disk 41 and the adjacent member 30 is a coil spring 43 which yieldingly tends to hold the shaft 40 at the right-hand limit of its movement.

Fixed to the opposite frame member 30 is a clutch member 44 in which the shaft 40 rotates freely. The clutch member 44 is provided with beveled teeth 45 arranged to coact with similar beveled teeth of a coacting clutch member 46, rotatably and slidably mounted on the shaft 40 between the clutch member 44 and the friction disk 42. A lever arm 47 extends rearwardly from the movable clutch member 46. The mechanism for sliding the wheel 39 on the shaft 28 will be hereinafter described, as will the mechanism for operating the lever 47.

It may, however, at this time be noted that by moving the lever 47 in one direction, the beveled teeth of the clutch members 45 and 46 will coact for forcing the shaft 40 longitudinally to the left.

Assuming that normally the wheel 39 is in engagement with the disk 41, then the first part of the movement of the clutch member 46 moves the shaft 40 for throwing the transmission, now being described, into neutral position. A further movement of the member 46 will shove the disk 42 into engagement with the friction wheel 39 for reversing the movement of the shaft 40 as compared with its movement when the wheel 39 engages the disk 41.

On the shaft 40 is a sprocket wheel 48. The shaft 36 is divided, and the adjacent ends thereof carry the differential members 49 and 50 between which is the differential member 51 having gear teeth formed thereon. The differential member 51 is in line with a sprocket 48. A chain 52 travels on the member 51 and the sprocket 48. It will thus be seen that power from the engine shaft is transmitted through the wheel 39, the disks 41 and 42, the shaft 40, the sprocket 48, the chain 52, the differential, hereinbefore described, the shaft 36, the sprockets 37, the chains 38 and the sprockets 12 to the traction wheels 11.

Mounted on the members of the shaft 36, on opposite sides of the differential, are band brakes 53 of ordinary construction having the controlling levers 54. It will be noted that the heavy engine and the transmission mechanism are mounted upon the frame 15, which turns with the axle 10 with relation to the frame 20. It will be noted that it is desirable to have controlling mechanism mounted on the fixed members of the frame and adapted to control the wheel 39, the clutch member 46, and brakes which are mounted on the movable frame, and that this arrangement of the parts involves the necessity of a peculiar structure, whereby the parts may be properly and operatively connected. It has been suggested that my engine is sometimes used with the detachable frame portion, which will be hereinafter described, and it may be here stated that the seat even when said detachable frame portion is used is sometimes arranged at various distances from the front of the machine. The machine is also sometimes used with the detachable frame portion and with various farm implements and the like having seats. It is, therefore, also desirable that the controlling mechanism and the steering mechanism should be adjustable, so that they may be accessible to the driver from the driver's seat at all times. For accomplishing these objects, the following mechanism has been provided.

On the frame members 32 are mounted upwardly extending brackets 55, which at their upper ends support a transverse shaft 56, which is thus mounted upwardly and rearwardly from the axle 10 on what may be called the fixed frame work of the machine. Pivotally mounted on the shaft 56 is a rearwardly and upwardly extending brake controlling lever member 57 having a suitable pawl adapted to coact with a sector 58 mounted on said shaft 56 and having an arm 59 extending upwardly from the shaft 56 (see Figs. 1 and 6.)

Telescopically mounted in the outer end of the lever arm member 57 is a lever member 57$^a$ held in position by means of a set-screw 57$^b$, not shown but similar to the set-screw 57$^b$ shown in Fig. 6. The pawl, which is of the ordinary sliding type and therefore not particularly described, is operated by means of a rearwardly and upwardly extending tube 57$^c$, in the upper end of which is telescopically mounted a rod 57$^d$ which is held in position by means of a set-screw 57$^e$. The upper end of the rod 57$^d$ is operatively connected with a bell crank lever pivoted to a member 57$^a$ and similar to the member 57$^f$ shown in Fig. 6.

Rotatably mounted in suitable brackets 60 which extend upwardly from the frame members 30 is a shaft 61 arranged above and slightly rearwardly from the shaft 10, and below and forwardly from the shaft 56.

Extending upwardly and forwardly from the shaft 61 and fixed thereto is an arm 62, the upper end of which is arranged close to a line extended upwardly from the center of the shaft 10. Secured to the upper end of the arm 62 is a spring 63, which is connected with the upper end of the arm 59 by means of a link 64.

Mounted in the brackets 34 are short shafts 65, which extend to and are rotatably mounted in one end of each band brake, as shown in Fig. 7.

Secured to each shaft 65 is a pin 66 pivotally mounted in the other end of the band brake. Extending downwardly from each end of the shaft 61 is an arm 67, pivoted to which is a rearwardly extending link 68, which at its lower end is pivoted to a downwardly extending arm 69 on the shaft 65. It will be understood that the mechanism for controlling each band brake at each end of the shaft 61 is the same.

It will be seen that the upper end of the arm 62 is adjacent to a line extending upwardly from the middle of the shaft or axle 10, and that the spring 63 will allow sufficient play of the parts to permit the brakes to be operated from the brake lever in all positions of the rotation of the member 15.

Suitably mounted, as for instance on the engine above the middle of the shaft or axle 10 is an upright post 70, having at its upper end an annular flange 71. The shaft 70 is mounted to permit limited vertical sliding movement.

Pivotally mounted on the shaft 56 is a rearwardly and upwardly extending lever member 72 forming part of the reverse lever. Telescopically mounted on the upper end of the member 72 is a lever member 73, adjustably held in position by means of a set screw 57ᵇ, such as has already been described. The lever member 72 has a spring controlling sliding pawl of the ordinary type, adapted to coact with a sector 58, similar to that already described, and controlled by means of a member 57ᶜ such as that connected with the lever member 57.

Telescopically mounted on the lever member 57ᶜ, just described, is a rod 57ᵈ similar to that heretofore referred to, and pivoted to it is a bell crank lever 57ᶠ similar to that heretofore referred to, which bell crank is pivoted at the handle end of the member 73. The lever member 72 has a forwardly extending portion 74 having in its forward end a notch 75 adapted to receive the flange 71, and of sufficient depth to permit play of the parts when the lever is operated. Rotatably mounted on the shaft 61 is a sleeve 76. Extending forwardly from one end of the sleeve 76 is an arm, in the forward end of which is an elongated slot 78, in which travels a pin on the upright member 70. Extending rearwardly from the other end of the sleeve 76 is a lever 79, to the rear end of which is pivoted a link 80 which extends downwardly, and is pivoted to the arm 47 on the clutch member 46. It will be seen that by manipulation of the lever member 73, the member 70 may be raised and lowered thereby operating the members 77, 79, 80 for moving the arm 47 for operating the clutch member 46.

Pivoted to the shaft 56 is a rearwardly extending lever member 81, similar to the members 57 and 72. Telescopically mounted on the lever member 81 is a member 82, similar to the members 57ᵃ and 73. The lever member 81 has a spring actuated sliding pawl arranged to coact with a sector 58 similar to those already described, by mechanism similar to that hereinbefore referred to, as constituting part of the brake lever and reverse lever. The lever just described is the speed controlling lever and has a forwardly extending member 83 in the forward end of which is an elongated slot 84, in which is mounted a pin 85 on a sleeve 86. The sleeve 86 is slidably mounted on post 70 and has near its lower end spaced annular circumferential flanges 87.

Pivoted on the shaft 61 is a bell crank lever having an upwardly and forwardly extending arm 88, the forward end of which is received between the flanges 87 and a downwardly extending arm 89 on the lower end of which is a pin 90 received in an annular groove 91 on the hub of the wheel 39. It will be seen that the lever member 82 may be used for sliding the wheel 39 longitudinally on the engine shaft 28.

The detachable frame portion of my improved engine comprises a pair of spaced parallel arms 92 and 93, detachably and adjustably mounted on the arms 33 by means of bolts 94 which are selectively mounted in holes in the arms 33. The arms 92 and 93 have at their rearward ends rearwardly and inwardly extending members 95, shown in Fig. 1, which at their rear ends form a vertical bearing 96, in which is mounted the bushing 97 which is arranged to rotate but not to slide in the bearing 96.

Formed on the upper part of the sleeve or bushing 97 is a grooved wheel 98 having the parallel spaced flanges 99. In the upper flange 99 are a plurality of openings 100.

Extended through the sleeve 97 is a vertical bolt 101, having an upper head 102 and the lower screw-threaded portion 103. Formed on the lower part of the sleeve 97 is a socket 104, which receives the upwardly extending cylindrical member 105 provided with a screw-threaded opening to receive the bolt 101. Formed on the member 105 are downwardly extending yoke members 106. Between the lower ends of the yoke members 106 is mounted a caster wheel 107. It will be seen that the bolt 101 may be frictionally locked with the sleeve 97 by screwing it tightly into the cylindrical member 105. The sleeve 97 rotates in the bearing 96.

In Fig. 13 I have shown a modified form of the supporting member at the rear end of the detachable frame, comprising a yoke 108, which has at its upper end a cylindrical portion 105, similar to that already described, and adapted to be mounted on the socket 104 and to receive the bolt 101. The members of the yoke 108 are spread farther from each other than the portion of the yoke 106, and have at their lower ends the downward parallel extensions 109 in which are the elongated vertical slots 110. An axle 111 is mounted in the slots 110. On the outer ends of the axles 111 are detachably mounted wheels 112.

A powerful coil spring 113 is mounted on the axle 111.

For steering both the front and the rear wheels the following means have been provided:

Connecting the members 32 is a transverse member 114. On the member 114 is a bearing 115 in which is mounted a short shaft 116, on the lower end of which is a beveled gear 117 in mesh with a beveled gear 118 on a shaft 119 arranged at a tangent with the rotary member 15.

The shaft 119 is mounted in bearings 120 mounted on the stationary part 20 of the frame. The shaft 119 has formed on it a worm gear 121 in mesh with the teeth of the gear member 19 of the rotary member 15. It will be seen that by rotating the shaft 116, the worm gear 121 will be rotated for rotating the member 15. The shaft 116 is connected by a universal joint 122, and with an upwardly and rearwardly extending steering shaft 123.

Mounted on the fixed part of the frame is a curved upwardly extending arm 124 having a plurality of openings 125 arranged in a line on the arc of a circle having its center at the center of the universal joint 122.

The shaft 123 is angular, as shown in Fig. 9.

Telescopically mounted on the shaft 123 is an angular sleeve or tubular member 126. Slidably mounted on the member 126 is a cylindrical tubular member 127, formed on the lower end of which is a drum 128 having spaced annular flanges 129.

Mounted on the member 127 near the drum 128 is a collar 130 having flanges 131 detachably and adjustably mounted on the member 124 by means of bolts 132 extending through the holes 125.

The parts just described are so arranged that by removing the bolts 132, the steering post may be adjusted upwardly and downwardly and secured in any position by selectively mounting the bolts 132 in the proper openings 125.

Detachably mounted on the outer end of the sleeve 126 is a steering wheel 136, whereby the steering mechanism may be operated for rotating the member 15 and turning the wheels 11.

Rotatably mounted on the upper end of the member 126 is a hub 137 of another steering wheel 138 to which is secured a member 139 tubular in form and having a longitudinal slot formed therein. The member 139 is mounted on the member 127 and may be locked in various positions thereon by means of screw-threaded bolts 140 extended through flanges 141 formed on opposite sides of the longitudinal slot 142, above referred to.

Secured to the drum 128 are two flexible members 143 and 144 which are extended around guide rollers 145 on the member 114 and thence rearwardly to the wheel or drum 98.

For securing the ends of the members 143 and 144 to the wheel 98, there are provided flat bars 146 having at one end upwardly extending portions 147 adapted to be selectively received in the openings 100 and to be held in position by means of cotter pins or the like extended through openings 148 in the member 147. At the ends of the members 146 opposite the members 147 are downwardly inclined portions 149 having openings receiving the flexible members 143 and 144 in which knots may be tied for holding them in position. The members 143 and 144 are preferably formed in two parts, the parts being connected by suitable screw-threaded sleeves and turn-buckles 150.

From the foregoing description it will be seen that when it is desired to vary the height of the steering wheels 136 and 138, this may be accomplished by loosening the bolts 132 and selectively mounting them in different holes 125. When it is desired to move the members 136 and 138 rearwardly, the bolts 140 are loosened, whereupon the wheel 138 may be slid rearwardly carrying with it the wheel 136 and sliding the member 139 on the member 127, and at the same time slide the member 126 on the shaft 123. When the members 136 and 138 have reached the desired position the bolts 140 may be screwed tight and the steering wheels are again ready for use.

It will be seen that by rotating the wheels 138, the flexible members 143 and 144 may be wound upon the drum 128, thereby rotating the wheel 98 and turning the caster wheel 107 or the yoke 108 and the wheels 112 as the case may be. Where the frame members 93 are adjusted with relation to the frame members 92, the turnbuckles 150 are loosened, the members 146 are removed from the wheel 98, and after the frame has been adjusted, the members 143 and 144 are wound on the wheel 98, until they are almost tight enough, and the members 148 and 146 are adjusted with the members 148 received in the proper holes 100. The turn-buckles may then be tightened and the device is made ready for use.

Measurements of a large number of farm implements have demonstrated that the frame members may be readily and easily bolted to a large number of farm machines now used in this section of the country.

When the detachable frame members 92 and 93 and the parts mounted thereon are removed from the machine, and the traction engine is secured to some such farm machine, then it is desirable to be able to adjust the controlling levers and the steering wheels which can be done as hereinbefore described. It may also be noted that many implements, such as cultivators and plows may be mounted on the machine when the adjustable frame is used therewith. For purposes of illustration I have used a cultivator mounted on the machine.

The cultivator attachment comprises a forward frame including the parallel downwardly extending frame members 151 having a plurality of holes 152, whereby the members 151 may be adjustably mounted on the frame members 92 and 93 of the machine by means of bolts 153, selectively mounted in the holes 152. The lower ends of the members 151 are connected by a transverse bar 154.

Beams 155 of a cultivator may be secured to the member 154. A brace member 156 may be secured to the member 154, and extended forwardly and secured to a yoke 157 mounted on the axle 10.

On the frame rearwardly of the member 151 may be detachably mounted a transverse frame member 158 on which are upwardly extending brackets 159, at the upper ends of which are bearings 160 in which is slidably mounted a transverse shaft 161. On the transverse member 158 are mounted brackets 162 in which are supported guide pulleys 163, which pulleys are arranged on opposite sides of the center of the machine. A chain 164 is secured to the middle of the shaft 161 by means of a bolt 165 and is extended over the guide pulleys 163 and thence downwardly through suitable openings 166 in the member 158.

Pivoted to the frame of the machine, at the opposite sides thereof in front of the shaft 161 are lever arms 167 extending rearwardly and inwardly, and have on their rear ends foot rests or pedals 168. The ends of the chain 164 are secured to the respective lever arms 167. Secured to the chain 164 and to the shaft 161 is the central portion of a yoke having downwardly extending arms 169, slidably mounted in bearings on some of the plow beams. The rear ends of the beams are connected by a connecting bar 171. It will be seen that by pushing the respective foot pedal 169, the chain 164 may be drawn laterally in either direction as may be desired, and carries with it the members 169 and thereby swings the cultivator shovels 172, which are suitably mounted on the beams, laterally for moving the shovel for proper cultivation.

It is some times desirable to run the mechanism of a farm machine, which may be secured to my improved traction engine, directly from the engine and for that purpose, I have provided the following mechanism.

Formed on the fly wheel 29 is a beveled gear 173. Mounted on the frame member 20 is a frame device comprising the downwardly extending portion 176, and the connecting member 177, which is curved forwardly at its central portion forming a bearing 178 over the center of the axle 10, in which is mounted the shaft of a double faced beveled gear 179, one face of which is in engagement with the gear 173.

Forwardly of the shaft 10 there is formed on the member 177 a downwardly extending member 180, at the lower end of which is a bearing 181 in which is rotatably mounted a shaft 182 on which is a beveled gear 183 in mesh with the other face of the beveled gear 179. Extending downwardly from the rear portion of the member 177 is a member 184, the lower portion of which forms a bearing for the rear part of the shaft 182.

Connected with the shaft 182 by a universal joint 185 is a rearwardly extending rod 186, designed to be connected in any suitable way with the mechanism of any farm machine or the like, which may be attached to my improved engine. It will readily be seen that the shaft 186 may be disconnected from the universal joint and removed from the machine.

It may be noted that the wheels 112 are longitudinally adjustable on the shaft 111 and are held in their various positions on the shaft by means of set-screws 188. On account of the fact that all of the traction wheels are independently adjustable, the wheels may be made to run in various positions with relation to the machine for the purpose of adjusting the machine, so that the wheels may travel in or out of certain furrows.

In the practical use of my improved traction engine, the parts being assembled as hereinbefore described, it will be noted that the traction wheels may be operated from the engine through the engine shaft, the wheel 39, the disks 42 and 41, the shaft 40, the sprocket wheel 48, the chain 52, the differential, the parts of the shaft 36, and the sprockets thereon, together with the sprockets on the traction wheels and the chains 12. The traction wheels may be operated in either direction by manipulating the lever 72 for raising and lowering the member 70, thereby raising and lowering the link 77 for varying the position of the lever arm 47, and thereby operating the clutch member 46 for moving the shaft 40 longitudinally for selectively bringing the disks 42 or 41 into engagement with the friction wheel 39. The speed of the shaft 40 and hence of the traction wheels may be varied by manipulating the lever 81 for raising and lowering the sleeve 86, thereby manipulating the parts 88 and 89 of the bell crank lever for adjusting the wheel 29 longitudinally on the engine shaft.

The brakes may be applied by means of the lever 57 and the arm 62, the shaft 61, the arms 67 and the links 68, the shafts 65 and the arms 54.

Where the length of the machine is adjusted by varying the positions of the members 92 and 93 with relation to the members 33, the turn-buckles 150 are first loosened, the members 146 are then removed, the frame adjusted, and the members 147 secured to the flange 99 of the drum or wheel 98 at the proper point thereon. The turn-buckles may then be tightened.

Mounted on the rear portion of the detachable frame is a seat 190. If it is desired to adjust the steering wheels, and the controlling levers to correspond to the adjustment of the length of the machine, this may be accomplished in the manner hereinbefore described.

The detachable portion of the frame may be used with the single caster wheel 107 or with the wheels 112, depending upon the nature of the work to be done.

If it is desired, the detachable portion of the frame may be entirely removed, and a farm implement connected with the frame members 33.

Various cultivating plows may be substituted for the cultivator here shown for purposes of illustration.

The working mechanism of farm machines may be connected with the engine by means of the shaft 186. It will be noted that both front and rear wheels are steerable, so that the machine may be turned in a minimum of space and accurately operated.

Attention is called to the fact that the heavy parts of the engine and gearing are mounted directly on the heavy axle and turn with it when the traction wheels are moved laterally.

The traction wheels and the sprockets on the shaft 36 may be adjusted for varying the width or tread of the machine and the distance of the wheels 112 from each other may be varied in a similar way.

It will be seen that my improved engine is thus adjusted for a great variety of uses.

By throwing the friction disks into neutral position, the engine can be run and the shaft 186 connected with stationary machinery, such as a pump, a churn, a corn sheller, wood saw, elevator or the like.

It will readily be seen that numerous changes may be made in the construction and arrangement of the parts of my improved traction engine, and the form of the device here shown is simply illustrative of my invention, it being my intention to cover by my present application any such modification of structure as may be included within the reasonable scope of my claims.

I claim as my invention:

1. In a device of the class described, a frame mounted on wheels, said frame being capable of longitudinal adjustment for varying its length, a source of power mounted on said frame, means for operatively connecting the source of power with certain of the wheels for imparting motion thereto, and a steering device capable of adjustment for accommodating said steering device to different lengths of the frame.

2. In a machine of the class described, a pair of traction wheels mounted adjacent to the front end of the frame, a supporting wheel adjacent to the rear end of the frame, a source of power, means for operatively connecting said source of power with the traction wheels, and means for adjusting the length of said frame.

3. In a machine of the class described, a longitudinally extensible frame, means for locking the frame in any of a plurality of adjusted positions, wheels at both ends of the frame, means for steering the wheels at either end independently of those at the other end and means for driving certain of said wheels.

4. In a machine of the class described, a frame, a pair of traction wheels mounted near the forward part of said frame, a supporting wheel at the rear part of said frame, a source of power, means for imparting motion from said source of power to said traction wheels, means for steering all of said wheels, the wheels at the forward and rearward end of the machine being capable of adjustment longitudinally of the machine with relation to each other.

5. In a machine of the class described, a longitudinally extensible frame, means for locking the frame in any of a plurality of adjusted positions, wheels at both ends of the frame, means for steering the wheels at either end independently of those at the other end, extensible controlling devices for said last described means, and means for driving certain of said wheels.

6. In a machine of the class described, a longitudinally extensible frame, means for locking the frame in any of a plurality of adjusted positions, wheels at both ends of the frame, means for steering the wheels at either end indpendently of those at the other end, one of said means being extensible to correspond with the adjustment of the length of the frame, and means for driving certain of said wheels.

7. In a machine of the class described, a longitudinally extensible frame, means for locking the frame in any of a plurality of adjusted positions, wheels at both ends of the frame, means for steering the wheels at either end independently of those at the other end, one of said means being extensible to correspond with the adjustment of the length of the frame, extensible controlling devices for said steering devices, and means for driving certain of said wheels.

8. In a machine of the class described, a longitudinally extensible frame, means for locking the frame in any of a plurality of adjusted positions, wheels at both ends of the frame, means for steering the wheels at either end independently of those at the other end, a shaft journaled in said frame adapted to drive auxiliary machinery and means for operatively connecting said shaft with the last described means.

9. In a device of the class described, a frame, an axle secured thereto, spaced traction wheels mounted on the axle, means mounted on the frame for driving said wheels, a second frame having one end pivotally mounted relative to the first frame, said second frame being longitudinally extensible, steerable wheels at the second end of the second frame, and means for securing a ground working implement to the second frame.

10. In a device of the class described, a frame, an axle secured thereto, spaced traction wheels mounted on the axle, means mounted on the frame for driving said wheels, a second frame having one end pivotally mounted relative to the first frame, said second frame being longitudinally extensible, steerable wheels at the second end of the second frame, and vertically adjustable.

11. In a device of the class described, a frame mounted on wheels, a source of power mounted on said frame, a second frame mounted on said first frame, a wheel for supporting said second frame, a steering device mounted on said second frame for rotating the first frame with relation to the second frame including a steering shaft, a member rotatably mounted with relation to said steering shaft and operatively connected with said last described wheel.

12. In a device of the class described, a frame mounted on wheels, a source of power mounted on said frame, a second frame mounted on said first frame, a wheel for supporting said second frame, a steering device mounted on said second frame for rotating the first frame with relation to the second frame including a steering shaft, a member rotatably mounted on said steering shaft, a steering wheel operatively connected with said last described member, a drum on said last described member, a drum operatively connected with said last described wheel, flexible devices wound on said drums, guide pulleys over which said flexible devices are supported.

13. In a device of the class described, a frame mounted on wheels, a source of power mounted on said frame, a second frame mounted on said first frame, a wheel for supporting said second frame, a steering device mounted on said second frame for rotating the first frame with relation to the second frame including a steering shaft, a member rotatably mounted on said steering shaft, a steering wheel operatively connected with said last described member, a drum on said last described member, a drum operatively connected with said last described wheel, flexible devices wound on said drums, guide pulleys over which said flexible devices are supported, and means for adjusting said flexible devices with relation to said second drum.

14. In a device of the class described, a frame mounted on wheels, a source of power mounted on said frame, a second frame mounted on said first frame, a wheel for supporting said second frame, a steering device mounted on said second frame for rotating the first frame with relation to the second frame including a steering shaft, a member rotatably mounted on said steering shaft, a steering wheel operatively connected with said last described member, a drum on said last described member, a drum operatively connected with said last described wheel, flexible devices wound on said drums, guide pulleys over which said flexible devices are supported, means for adjusting said flexible devices with relation to said second drum, said flexible devices including means for adjusting their length.

15. In a device of the class described, an axle, a traction wheel thereon, a frame supported by said axle, a second frame rotatably mounted on said first frame, an engine on said first frame, gearing mechanism supported by said first frame for operatively connecting said engine with said traction wheels, a steering shaft on said second frame, means for connecting said shaft with said first frame for rotating it with relation to the second frame, a member telescopically but nonrotatably mounted on said steering shaft, and a steering wheel on said member Des Moines, Iowa, December 6, 1915.

SANFORD L. TIMMONS.